United States Patent [19]

Takahashi

[11] Patent Number: 4,741,019
[45] Date of Patent: Apr. 26, 1988

[54] CORDLESS TELEPHONE
[75] Inventor: Nobuyuki Takahashi, Gunma, Japan
[73] Assignee: Sanyo Electric Co., Ltd., Japan
[21] Appl. No.: 711,300
[22] Filed: Mar. 13, 1985
[30] Foreign Application Priority Data Mar. 15, 1984 [JP] Japan .................. 59-50515
Mar. 19, 1984 [JP] Japan .................. 59-52726
Mar. 19, 1984 [JP] Japan .................. 59-52727

[51] Int. Cl.⁴ .................................................. H04Q 7/04
[52] U.S. Cl. ........................................ 379/61; 379/63
[58] Field of Search ............... 179/2 E, 2 EA, 2 EB; 455/58; 379/61, 62, 63

[56] References Cited
U.S. PATENT DOCUMENTS

| 4,012,597 | 3/1977 | Lynk, Jr. et al. | 179/2 E |
| 4,352,955 | 10/1982 | Kai et al. | 179/2 EB |
| 4,411,017 | 10/1985 | Talbot | 455/26 |
| 4,560,832 | 12/1985 | Bond | 179/2 EA |
| 4,574,163 | 3/1986 | Zato | 179/2 EA |
| 4,628,152 | 12/1986 | Åkerberg | 379/61 |
| 4,640,987 | 2/1987 | Tsukada et al. | 379/62 |
| 4,650,928 | 3/1987 | Numata | 379/62 |
| 4,659,878 | 4/1987 | Dinkins | 370/71 |
| 4,661,970 | 4/1987 | Akaiwa | 379/62 |
| 4,672,658 | 6/1987 | Kavehrad et al. | 379/63 |
| 4,679,225 | 7/1987 | Higashikama | 379/62 |
| 4,682,350 | 7/1987 | Åkerberg | 379/61 |
| 4,682,351 | 7/1987 | Makino | 379/62 |
| 4,694,485 | 9/1987 | Iwase | 379/62 |

Primary Examiner—Robert Lev
Attorney, Agent, or Firm—Darby & Darby

[57] ABSTRACT

A master station 1 is connected with a telephone line 2. For this master station 1, a plurality of hand sets are provided. Each hand set is set to different transmitting and receiving frequencies to communicate with the master station 1. Each hand set generates from an information signal generating circuit 35, an information signal representing the operation state of the hand set and transmits the information signal by a transmitting circuit 37. The master station 1 receives the information signal through a monitor receiving circuit 4. The monitor receiving circuit 4 has a receiving frequency which changes cyclically to be tuned successively to all the transmitting frequencies of the respective hand sets. Accordingly, the monitor receiving circuit 4 receives successively the information signals from the respective hand sets. The received information signals are detected by a second detecting circuit 10 and a third detecting circuit 11 to be supplied to a control circuit 3. The control circuit 3 stores the information signals in a status table of a RAM 18. Consequently, by referring to this status table, the operation states of the respective hand sets can be determined.

10 Claims, 11 Drawing Sheets

| HAND SET | $D_1$ | $D_2$ | $D_3$ | $D_4$ |
|---|---|---|---|---|
| 1 | 0 | 0 | 0 | 1 |
| 2 | 0 | 0 | 1 | 0 |
| 3 | 0 | 0 | 1 | 1 |
| ⋮ | | ⋮ | | |
| 10 | 1 | 0 | 1 | 0 |

FIG. 6

| $P_1$ | $P_2$ | STATE OF HAND SET |
|---|---|---|
| 0 | 0 | STANDBY MODE |
| 1 | 0 | TELEPHONE LINE CALL DEMAND OR STATE OF CALL |
| 0 | 1 | INTERCOMMUNICATION DEMAND OR STATE OF INTERCOMMUNICATION |
| 1 | 1 | TRANSFER DEMAND |

FIG. 7

| HAND SET CODE | | | | $P_1$ | $P_2$ |
|---|---|---|---|---|---|
| 0 | 0 | 0 | 1 | 0 | 0 |
| 0 | 0 | 1 | 0 | 1 | 0 |
| 0 | 0 | 1 | 1 | 1 | 1 |
| | ⋮ | | | ⋮ | |
| 1 | 0 | 1 | 0 | 0 | 1 |

CORDLESS TELEPHONE

BACKGROUND OF THE INVENTION

1. Field of the Invention

The present invention relates to a cordless telephone and particularly to a cordless telephone comprising a master station connected to a telephone line and a plurality of hand sets set to different frequencies for transmission and reception to communicate with the master station by radio.

2. Description of the Prior Art

In the prior art, cordless telephones comprising a master station connected to a telephone line, in which a telephone call can be made by radio communication with the master station are known. Such a cordless telephone is described for example in Japanese Utility Model Publication Gazette No. 7649/1972.

If a number of hand sets having different transmitting and receiving frequencies are provided in such a cordless telephone, it is necessary to transfer a call signal to any one of the hand sets when a master station receives a call signal through a telephone line. In such a case, the master station needs to transfer the call signal to a hand set in the standby mode. If the master station transfers the call signal to a hand set not in the standby mode, the communication cannot be started. In consequence, it is necessary that the master station should be able to identify the operation states of the hand sets. However, in the past, there were no cordless telephones capable of performing such function. Moreover, it is desired these days that a cordless telephone should have multiple functions such as extention calling among the hand sets. If an intercommunication is made among the hand sets with the transmitting and receiving frequencies arranged freely among the hand sets, radio waves of various frequencies are applied in various directions around the master station, which might cause a disturbance in transmission of the radio waves. Accordingly, it is desired that an intercommunication among the hand sets should be made after the permission of the master station and, for this purpose, it is necessary that the master should always watch whether the hand sets request to make an intercommunication. However, in the prior art, there exist no cordless telephones being able to detect the operation states of the hand sets.

SUMMARY OF THE INVENTION

Therefore, a primary object of the present invention is to provide a cordless telephone in which a master station is capable of always watching the operation states of all the hand sets.

A secondary object of the present invention is to provide a cordless telephone in which a master station is capable of confirming individually the operation state of a certain hand set.

Briefly stated, in order to achieve the primary object in the invention, information signals representing the operation states of the respective hand sets are transmitted from the hand sets and the master station receives these information signals successively to monitor the operation states of the respective hand sets, based on the received information signals.

In order to achieve the secondary object in the invention, a prescribed signal is transmitted from the master station to a certain hand set and the hand set receiving this prescribed signal transmits a response signal to the master station. The master station receives the above mentioned response signal and, based on this response signal, determines the operation state of the above mentioned certain hand set.

According to the invention, in order to achieve the primary object, the operation states of all the hand sets can always be observed. Accordingly, when a call signal comes from the exterior, through a telephone line for example, the master station can immediately locate a hand set in the standby mode, so that communication can be started promptly. The master station can also respond promptly to a service request sent from hand sets, for example, a request for intercommunication among the hand sets.

According to the invention, in order to achieve the secondary object, the master station confirms the operation state of a certain hand set by transmitting a signal to and receiving a signal from the hand set and thus the master station can clearly determine the present operation states of the hand set. Accordingly, if a call signal is to be transferred to a certain hand set, the master station can transfer the call signal only to a hand set in the standby mode.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
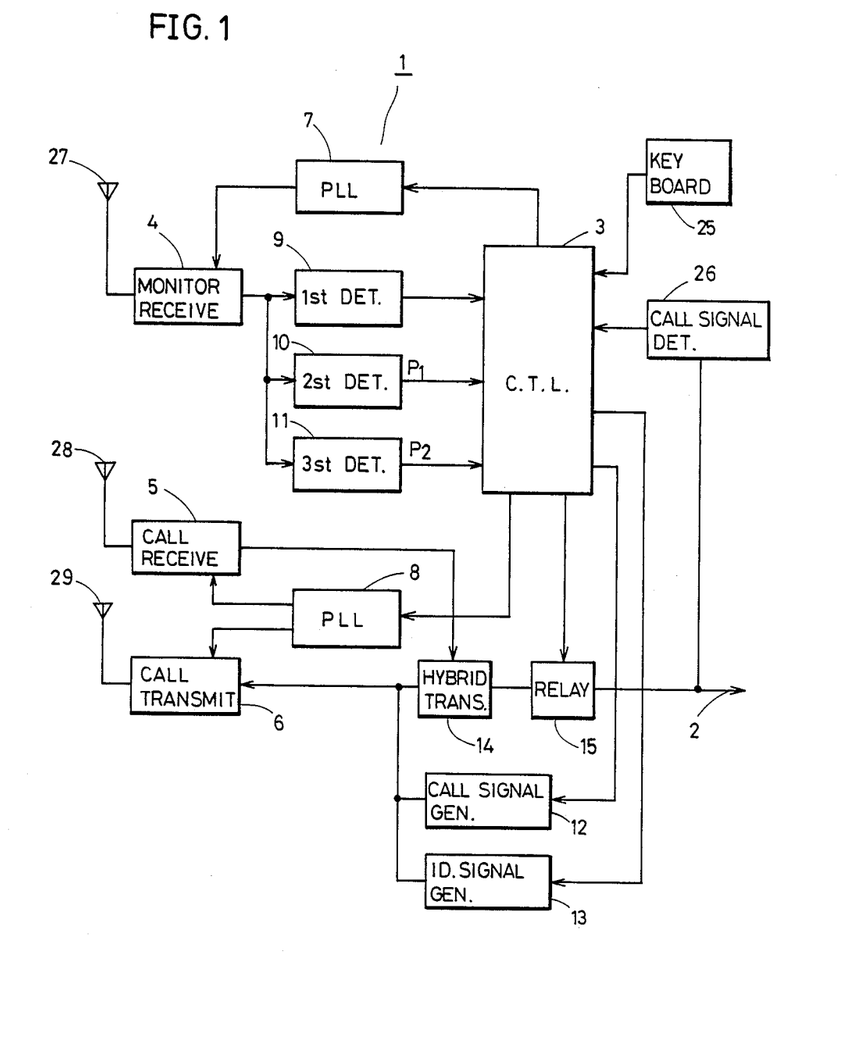
FIG. 1 is a schematic block diagram showing a master station for use in a cordless telephone of an embodiment of the present invention.

FIG. 1 is a schematic block diagram showing a master station for use in a cordless telephone of the present invention. In FIG. 1, a master station 1 to which a telephone line 2 is connected comprises a control circuit 3, a monitor receiving circuit 4, a call receiving circuit 5 and a call transmitting circuit 6. Antennas 27, 28 and 29 are connected to the monitor receiving circuit 4, the call receiving circuit 5 and the call transmitting circuit 6, respectively. The monitor receiving circuit 4 has a variable receiving frequency, which is set by the control circuit 3 and a phase locked loop (PLL) circuit 7. More specifically, the control circuit 3 cyclically changes code signals $D_1$, $D_2$, $D_3$ and $D_4$ supplied to the PLL circuit 7 whereby a frequency division ratio of a programmable divider (not shown) included in the PLL circuit 7 is changed cyclically. As a result, the receiving frequency of the monitor receiving circuit 4 changes intermittently to be tuned successively to the transmitting frequency of each hand set. On the other hand, the call receiving circuit 5 and the call transmitting circuit 6 are structured to have variable receiving frequency and variable transmitting frequency, respectively, which are controlled by the control circuit 3 and a PLL circuit 8. The master station 1 further comprises a first detecting circuit 9, a second detecting circuit 10 and a third detecting circuit 11 which are connected to the monitor receiving circuit 4. The first detecting circuit 9 serves to detect a carrier signal and a code signal based on the output of the monitor receiving circuit 4. The second detecting circuit 10 serves to detect an information signal $P_1$ based on the above mentioned output. The third detecting circuit 11 serves to detect an information signal $P_2$ based on the above mentioned output. The outputs of these first, second and third detecting circuits 9, 10 and 11 are supplied to the control circuit 3. The master station 1 further comprises a call signal generator 12 and an identification signal generator 13. The call signal generator 12 and the identification signal generator 13 are controlled by a control signal from the control circuit 3 to generate a call signal and an identification signal, respectively. The outputs of the call signal generator 12 and the identification signal generator 13 are supplied to the call transmitting circuit 6. The master station 1 further comprises a hybrid transformer 14 and a relay 15. The hybrid transformer 14 serves to connect the call receiving circuit 5 and the call transmitting circuit 6 to the telephone line 2. The relay 15 serves to control opening and closing operation between the hybrid transformer 14 and the telephone line 2. The relay 15 is controlled by a control signal from the control circuit 3. The master station 1 further comprises a keyboard 25 for providing instructions to the control circuit 3 and a call signal detecting circuit 26 for detecting a call signal transmitted from the exterior through the telephone line 2. The output of the call signal detecting circuit 26 is supplied to the control circuit 3.

Figure 2:
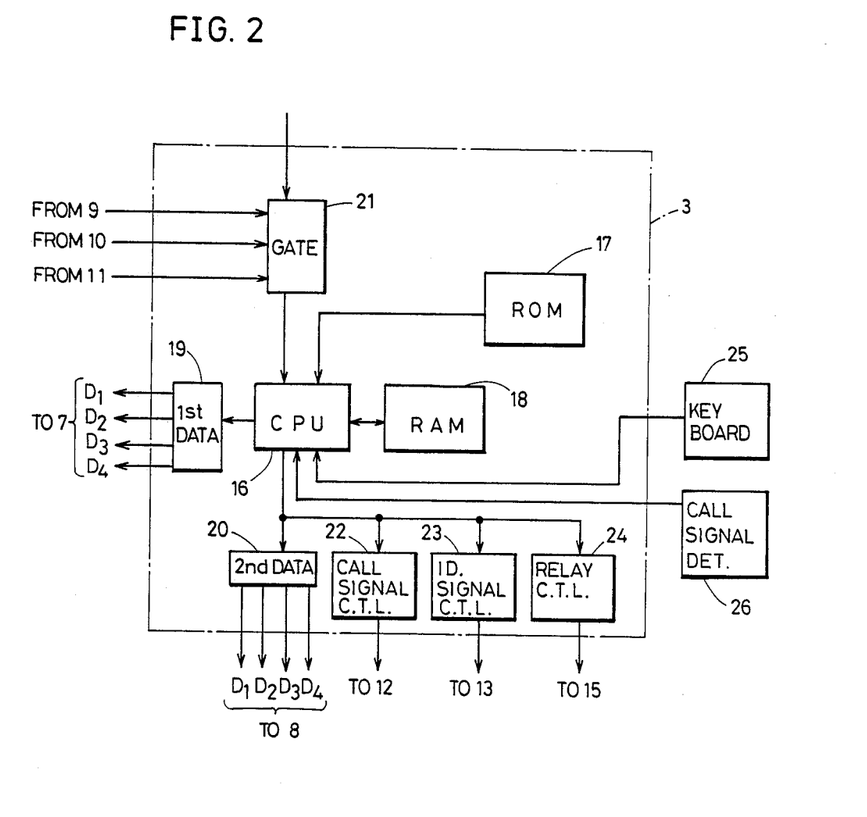
FIG. 2 is a block diagram showing in detail control circuit shown in FIG. 1.

FIG. 2 is a block diagram showing in detail the control circuit 3 shown in FIG. 1. As shown in FIG. 2, the control circuit 3 comprises a microcomputer. More specifically, the control circuit 3 comprises a central processing unit (CPU) 16 for processing the received signals to provide necessary signals, a read only memory (ROM) 17 for storing operation programs of the CPU 16 and a random access memory (RAM) 18 for storing the signals from the CPU 16 and providing the same as required. The outputs from the keyboard 25 and the call signal detecting circuit 26 are supplied to the CPU 16. The control circuit 3 further comprises a first data portion 19 for providing code signals $D_1$, $D_2$, $D_3$ and $D_4$ based on a signal from the CPU 16 and a second data portion 20 for providing the code signals $D_1$, $D_2$, $D_3$ and $D_4$ based on a signal from the CPU 16. The output of the first data portion 19 is supplied to the PLL circuit 7. The output of the second data portion 20 is supplied to the PLL circuit 8. The control circuit 3 further comprises a call signal control portion 22 for controlling the call signal generator 12 shown in FIG. 1 based on a control signal from the CPU 16, an identification signal control portion 23 for controlling the identification signal generator 13 shown in FIG. 1 based on a control signal from the CPU 16, and a relay control portion 24 for controlling the relay 15 shown in FIG. 1 based on a control signal from the CPU 16. The control circuit 3 further comprises a gate circuit 21 to which the outputs of the first, second and third detecting circuits 9, 10 and 11 shown in FIG. 1 are supplied. The output of the gate circuit 21 is supplied to the CPU 16.

Figure 3:
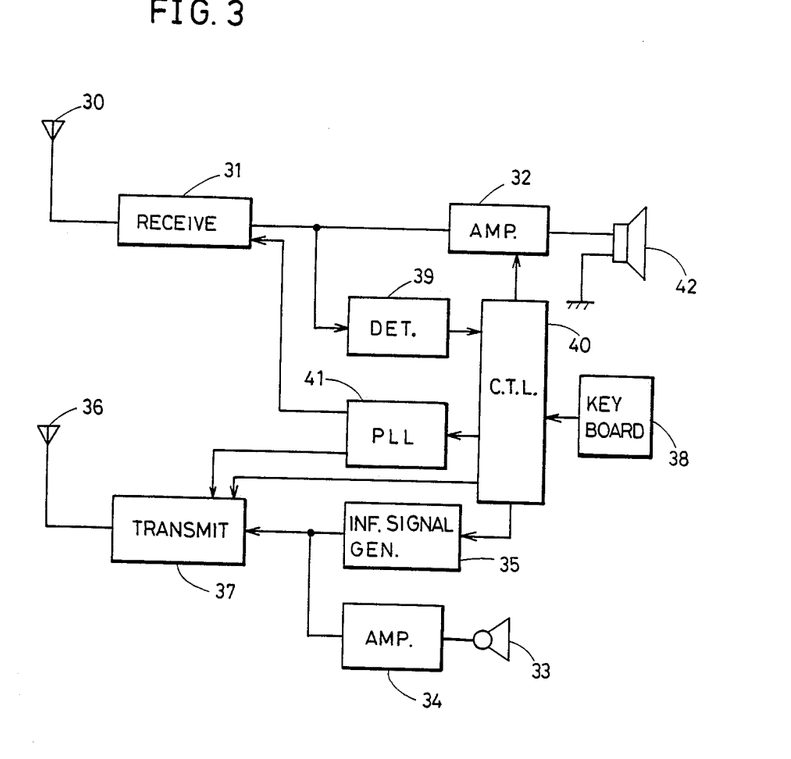
FIG. 3 is a schematic block diagram showing a hand set for use in a cordless telephone of an embodiment of the present invention.

FIG. 3 is a schematic block diagram showing a hand set for use in cordless telephone of an embodiment of the present invention. In FIG. 3, the hand set comprises a receiving circuit 31 to which an antenna 30 is connected and a transmitting circuit 37 to which an antenna 36 is connected. The receiving circuit 31 and the transmitting circuit 37 are structured to have respectively variable receiving frequency and transmitting frequency. A PLL circuit 41 is connected to the receiving circuit 31 and to the transmitting circuit 37 so that the receiving frequency of the receiving circuit 31 and the transmitting frequency of the transmitting circuit 37 are controlled by the PLL circuit 41 and a control circuit 40. The control circuit 40 comprises a microcomputer and other components. The output of the receiving circuit 31 is supplied to a speaker 42 through an amplifying circuit 32 as well as to a detecting circuit 39. The detecting circuit 39 serves to detect an identification signal and a permission signal for an intercommunication based on the output from the receiving circuit 31. The output of the detecting circuit 39 is supplied to the control circuit 40. On the other hand, a voice signal entered from a microphone 33 is supplied to the transmitting circuit 37 through an amplifying circuit 34. To the transmitting circuit 37, information signals $P_1$ and $P_2$ generated from an information signal generating circuit 35 are also supplied. The operation of the information signal generating circuit 35 is controlled by a control signal from the control circuit 40. The control circuit 40 is connected with a keyboard 38.

For one master station 1, one or two hand sets or more are provided, each hand set having the same structure as shown in FIG. 3.

Now, the operation of the above described embodiment will be described.

The "standby mode" of a hand set in the following description means the state in which the power source of the transmitting circuit 37 is turned off while the receiving circuit 31 is in the enabled state. The turning off of the power source of the transmitting circuit 37 in the standby mode meets the necessity for saving electric power as far as possible since a battery is utilized as a power source for a hand set which is transportable. More specifically, since the transmitting circuit 37 consumes a large amount of electric power, the power source thereof is turned off when the transmitting circuit 37 is not in use. In addition, in the following description, "intercommunication" means communication among the hand sets and "transfer" means transfer of the communication between a master station and a certain hand set to another hand set.

Figure 6:
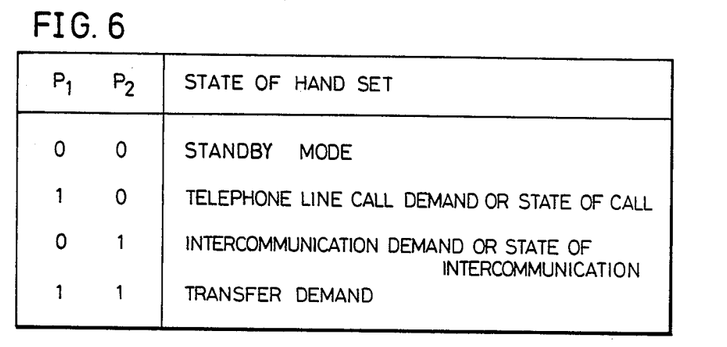
FIG. 6 is a diagram showing information signals representing the operation states of the respective hand sets.

First, in each hand set, the control circuit 40 provides code signals $D_1$, $D_2$, $D_3$ and $D_4$ to the PLL circuit 41 to set a frequency division ratio of a programmable divider (not shown) in the PLL circuit 41 to a predetermined value. As a result, the receiving frequency of the receiving circuit 31 and the transmitting frequency of the transmitting circuit 37 are set to values predetermined for each hand set. As required, the control circuit 40 makes the information signal generating circuit 35 generate information signals $P_1$ and $P_2$ representing the operation state of the hand set. The operation states of the hand sets represented by the information signals $P_1$ and $P_2$ are shown in FIG. 6. The information signals $P_1$ and $P_2$ provided from the information signal generating circuit 35 are supplied to the transmitting circuit 37. The transmitting circuit 37 modulates a carrier signal based on the received information signals $P_1$ and $P_2$ and transmits the modulated carrier signal from the antenna 36.

Figure 5:
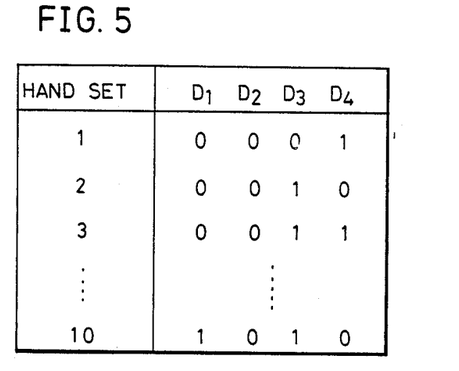
FIG. 5 is a diagram showing code signals allotted in advance to the respective hand sets.
Figure 7:
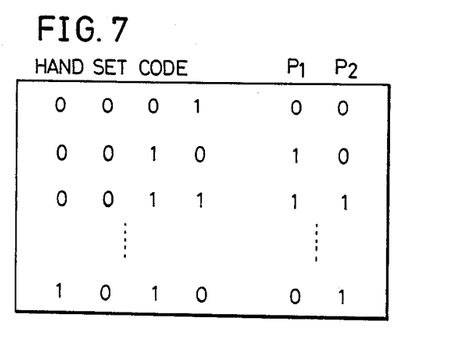
FIG. 7 shows a status table set in a RAM shown in FIG. 2.

On the other hand, in the master station 1, the CPU 16 supplies a control signal to the first data portion 19, which generates code signals $D_1$, $D_2$, $D_3$ and $D_4$. The code signals $D_1$, $D_2$, $D_3$ and $D_4$ are predetermined for each hand set as shown in FIG. 5. The CPU 16 controls the first data portion 19 so that the code signals of the respective hand sets are successively provided. The code signals $D_1$, $D_2$, $D_3$ and $D_4$ provided from the first data portion 19 are supplied to the PLL circuit 7 so that the frequency division ratio of the programmable divider (not shown) in the PLL circuit 7 changes cyclically. Accordingly, the receiving frequency of the monitor receiving circuit 4 changes successively to be turned to the transmitting frequency of the first hand set, that of the second hand set, that of the third hand set, . . . and that of the tenth hand set, in order. As a result, if the transmitting circuit 37 of each hand set operates to transmit signals from the antenna 36, the monitor receiving circuit 4 successively receives the signals. Among the signals received by the monitor receiving circuit 4, the first detecting circuit 9 detects a carrier signal of each hand set, the second detecting circuit 10 detects an information signal $P_1$ of each hand set and the third detecting circuit 11 detects an information signal $P_2$ of each hand set. The outputs of these first, second and third detecting circuits 9, 10 and 11 are supplied to a gate circuit 21 provided in the control circuit 3. The gate circuit 21 comprises for example an AND gate so that the outputs of the first, second and third detecting circuits 9, 10 and 11 are gated. The reason for gating the respective signals in the gate circuit 21 is that more correct information signals can be obtained by gating the information signals $P_1$ and $P_2$ with the carrier signal since the information signal provided from the second and the third detecting circuits 10 and 11 have the value 0 or 1 even if there is no transmission from the hand sets. The output of the gate circuit 21 is supplied to the CPU 16. In the RAM 18 of the control circuit 3, a status table as shown in FIG. 7 is established. The CPU 16 writes in the above mentioned status table, the information signals $P_1$ and $P_2$ successively supplied from the gate circuit 21. Accordingly, the operation states of the respective hand sets are stored in the status table and as a result, it is made possible for the CPU 16 to observe the operation states of the respective hand sets by referring to the status table.

In the following, the operation at the time when a call signal comes from the exterior through the telephone line 2 will be described. The call signal is detected by the call signal detecting circuit 26 and supplied to the CPU 16. The CPU 16 searches the status table (see FIG. 7) of the RAM 18 to find out a hand set where the information signals $P_1$ and $P_2$ are set to "0, 0", namely, a hand set in the standby mode. If the information signals $P_1$ and $P_2$ are set to "0, 0", the following two cases may be taken into consideration: the case where the hand set is completely in the disabled state with all the power source being turned off and the case where only the receiving circuit 31 is in the enabled state and the transmitting circuit 37 is in the standby mode, not in operation. Therefore, the master station 1 needs to determine either case. Now, if it is determined from the status table that the information signals of the first hand set are "0, 0", the operator of the master station 1 operates the keyboard 25 so that an instruction for making contact with the first hand set is provided to the CPU 16. Instead of the instruction from key board 25, CPU 16 may automatically perform the operation described subsequently. In consequence, the CPU 16 applies a control signal to the second data portion 20 so that a code signal "0, 0, 0, 1" representing the first hand set is provided from the second data portion 20. The code signal provided from the second data portion 20 is supplied to the PLL circuit 8 so that the programmable divider (not shown) included therein is set to a prescribed frequency division ratio. Accordingly, the receiving frequency of the call receiving circuit 5 and the transmitting frequency of the call transmitting circuit 6 are set to the transmitting and receiving frequencies of the first hand set. Then, the CPU 16 applies a control signal to the identification signal control portion 23 so that the identification signal generator 13 generates an identification signal for identifying the first hand set. The identification signal is predetermined for each hand set. The identification signal provided from the identification signal generator 13 is supplied to the call transmitting circuit 6 so as to be transmitted from the antenna 29 in accordance with the receiving frequency of the first hand set. On the side of the first hand set, if it is in the completely disabled state, no response is made since the receiving circuit 31 is not operated. If the first station is in the standby mode, the identification signal transmitted from the master station 1 is received by the receiving circuit 31. The identification signal thus received is detected by the detecting circuit 39 to be supplied to the control circuit 40. Upon receipt of the identification signal, the control circuit 40 determines whether the received identification signal with the identification signal of the hand set entered in advance from the keyboard 38 and if the identification signals coincide, the control circuit 40 enables the transmitting circuit 37 to temporarily operate. At the same time, the control circuit 40 applies a control signal to the information signal generating circuit 35 so that an information signal "0, 0" representing the standby mode is generated from the information signal generating circuit 35. This information signal "0, 0" is supplied to the transmitting circuit 37 so as to be transmitted from the antenna 36. In response, the monitor receiving circuit 4 of the master station 1 receives the information signal "0, 0" transmitted from the first hand set. Consequently, based on the thus received information signal "0, 0", the CPU 16 in the control circuit 3 can determine whether the first hand set is in the standby mode or not. When it is determined that the first hand set is in the standby mode, the CPU 16 provides a code signal "0, 0, 0, 1" representing the first hand set from the second data portion 20 so that the receiving frequency of the call receiving circuit 5 and the transmitting frequency of the call transmitting circuit 6 are made equal to the transmitting and receiving frequencies of the first hand set by means of the PLL circuit 8. At the same time the CPU 16 provides a control signal to the call signal control portion 22 so that a call signal is generated from the call signal generator 12. This call signal is supplied to the call transmitting circuit 6. As a result, the call transmitting circuit 6 transmits the call signal from the call signal generator 12 in accordance with the receiving frequency of the first hand set. In response, the receiving circuit 31 of the first hand set receives and demodulates the call signal transmitted from the master station 1. This call signal is amplified by the amplifying circuit 32 so as to drive the speaker 42. As a result, the operator of the first hand set knows there is a telephone call. Then, the operator of the first hand set operates the keyboard 25 to give an instruction to the control circuit 40 to change the state of the hand set from the standby mode to the call state. In consequence, the control circuit 40 operates the transmitting circuit 37 and makes the information signal generating circuit 35 generate, an information signal "1, 0" representing a demand for telephone line call. Accordingly, the transmitting circuit 37 transmits this information signal "1, 0". In the master station 1, the monitor receiving circuit 4 receives the information signal "1, 0" from the first hand set so that this information signal is supplied to the control circuit 3 through the first, second and third detecting circuits 9, 10 and 11. Thus, the CPU 16 determines that the first hand set issues a demand for telephone line call and applies a control signal to the relay control portion 24 so that the relay 15 is excited. Consequently, the relay 15 is closed so that the telephone line 2 is closed. The CPU 16 maintains the excitation of the relay 15 till the supply of the information signal "1, 0" from the first hand set is stopped. Thus communication is performed. More specifically, a voice signal entered from the microphone 33 is amplified by the amplifying circuit 34 and then transmitted from the transmitting circuit 37 so that the voice signal thus transmitted is received and demodulated by the call receiving circuit 5 of the master station 1. The output of the call receiving circuit 5 is supplied to the telephone line 2 through the hybrid transformer 14 and the relay 15. On the other hand, a voice signal of the person on the opposite side transmitted through the telephone line 2 is supplied to the call transmitting circuit 6 through the relay 15 and the hybrid transformer 14 so as to be transmitted in accordance with the transmitting frequency of the first hand set. Thus, the telephone call can be made from the hand set to the person on the side of the master station 1.

Now, with regard to the operation in the case of an intercommunication among the hand sets, an example of an intercommunication between the first hand set and the second hand set will be described in the following.

First, the operator of the first hand set operates the keyboard 38 to give an instruction for intercommunication with the second hand set to the control circuit 40. Then, the control circuit 40 operates the transmitting circuit 37 and at the same time makes the information generating circuit 35 generate an information signal "0, 1" representing a demand for intercommunication. The control circuit 40 generates a code signal "0, 0, 1, 0" representing the second hand set and supplies this code signal to the transmitting circuit 37. Consequently, the transmitting circuit 37 transmits the information signal "0, 1" and the code signal "0, 0, 1, 0". On the other hand, the receiving frequency of the monitor receiving circuit 4 is controlled to be tuned successively to the transmitting frequency of each hand set as described above. As a result, when the receiving frequency of the monitor receiving circuit 4 coincides with the transmitting frequency of the first hand set, the information signal "0, 1" and the code signal "0, 0, 1, 0" transmitted from the first hand set are received by the monitor receiving circuit 4. The received information signal and code signal are detected by the first, second and third detecting circuits 9, 10 and 11 so as to be supplied to the control circuit 3. Then, the CPU 16 of the control circuit 3 searches the status table in the ROM 18 to check the operation state of the second hand set corresponding to the code signal "0, 0, 1, 0". If the information signal stored with respect to the second hand set is other than "0, 0", the second hand set is used for any purpose and therefore it is impossible to make an intercommunication to the second hand set. Accordingly, no signal is returned to the first hand set from the master station 1. On the other hand, if the information signal stored with respect to the second hand set is "0, 0", the CPU 16 provides the code signal "0, 0, 1, 0" from the second data portion 20 and makes the receiving frequency of the call receiving circuit 5 and the transmitting frequency of the call transmitting circuit 6 coincide with the transmitting and receiving frequencies of the second hand set by means of the PLL circuit 8. Subsequently, the CPU 16 generates an identification signal representing the second hand set from the identification signal generator 13. This identification signal is transmitted in accordance with the receiving frequency of the second hand set by the call transmitting circuit 6. If the second hand set is in the standby mode, the identification signal transmitted from the master station 1 is received by the receiving circuit 31. The received identification signal is detected by the detecting circuit 39 and supplied to the control circuit 40. In consequence, the control circuit 40 brings the transmitting circuit 37 into the enabled state and makes the information signal generating circuit 35 generate an information signal "0, 0" representing the standby mode. As a result, the transmitting circuit 37 transmits this information signal "0, 0". In the master station 1, the information signal "0, 0" transmitted from the second hand set is received by the monitor receiving circuit 4 so as to be supplied to the control circuit 3 through the first, second and third detecting circuits 9, 10 and 11. Then, the CPU 16 determines that the second hand set is in the standby mode and the CPU 16 provides a code signal "0, 0, 0, 1" representing the first hand set from the second data portion 20. In consequence, the PLL circuit 8 makes the receiving frequency of the call receiving circuit 5 and the transmitting frequency of the call transmitting circuit 6 coincide with the transmitting and receiving frequencies of the first hand set. The CPU 16 applies a control signal to the identification signal control portion 23 so that a permission signal for intercommunication is provided from the identification signal generator 13. This permission signal is transmitted from the call transmitting circuit 6 in accordance with the receiving frequency of the first hand set. On the other hand, the receiving circuit 31 of the first hand set receives the permission signal transmitted from the master station 1. The permission signal thus received is detected by the detecting circuit 39 to be supplied to the control circuit 40. As a result, the control circuit 40 changes the frequency division ratio of the programmable divider (not shown) included in the PLL circuit 41 so that the receiving frequency of the receiving circuit 31 and the transmitting frequency of the transmitting circuit 37 coincide respectively with the transmitting and receiving frequencies of the second hand set. Accordingly, an intercommunication between the first hand set and the second hand set can be started. When the intercommunication is ended, the control circuit 40 detects the end and returns the transmitting and receiving frequencies of the first hand set to the initial values.

Figure 11:
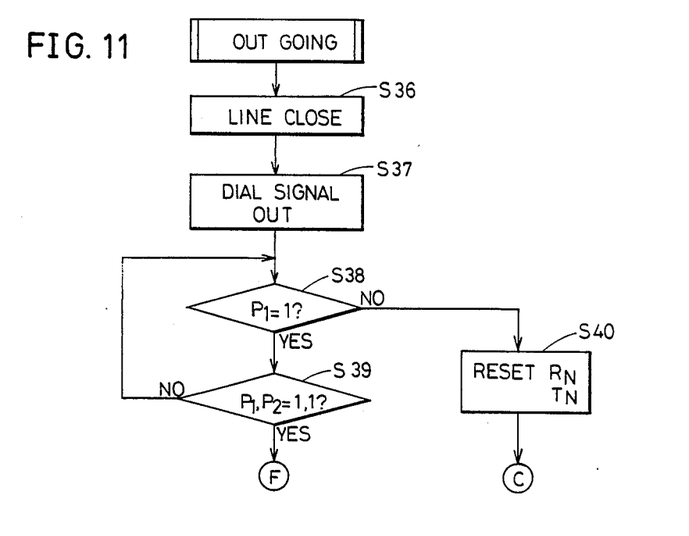
Figure 12:
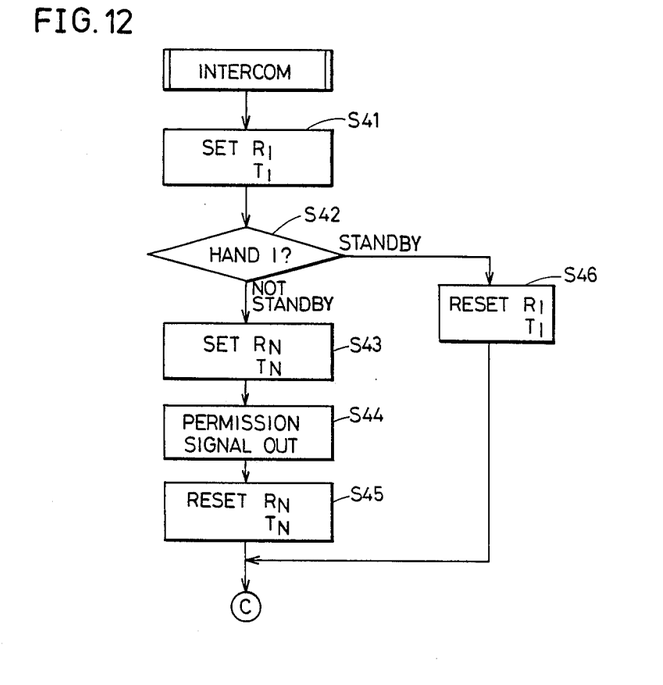
Figure 13:
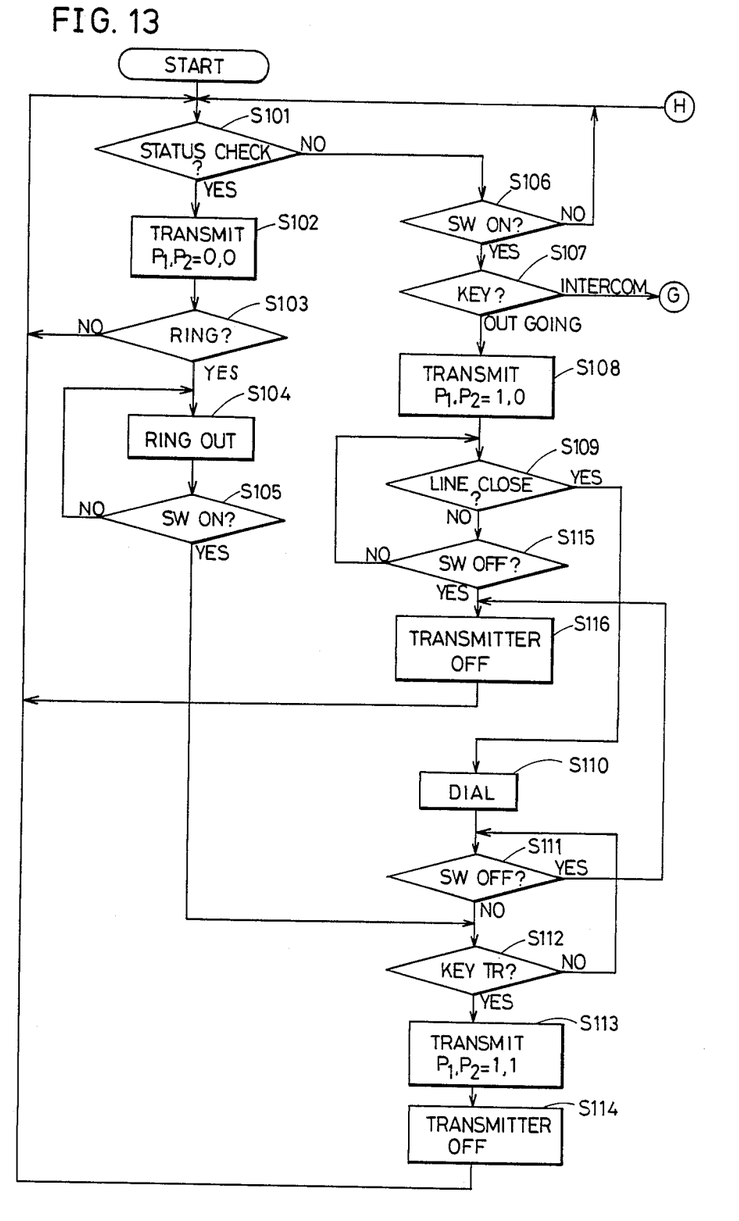
FIGS. 13 and 14 are flow charts showing an example of the operation of a control circuit in a hand set.
Figure 14:
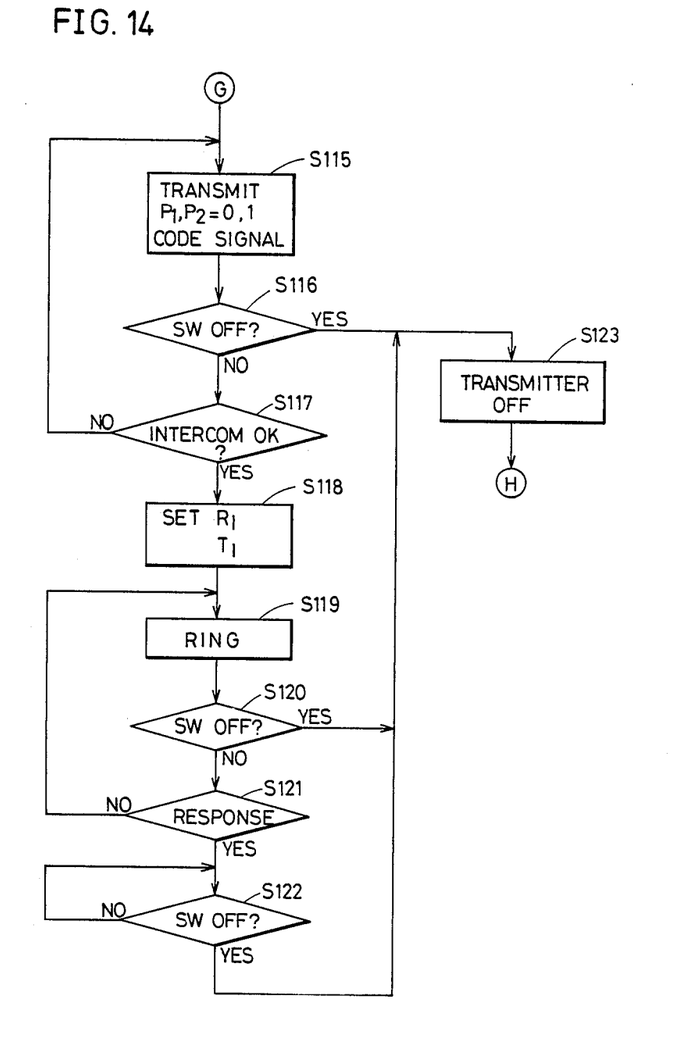

FIGS. 8 to 14 show as an example flow charts for performing the operation of the above described embodiment. FIGS. 8 to 12 are flow charts showing the operation of the control circuit 3 in the master station 1. FIGS. 13 and 14 are flow charts showing the operation of the control circuit 40 in the hand set. The operations shown in these flow charts will be briefly described in the following.

Figure 8:
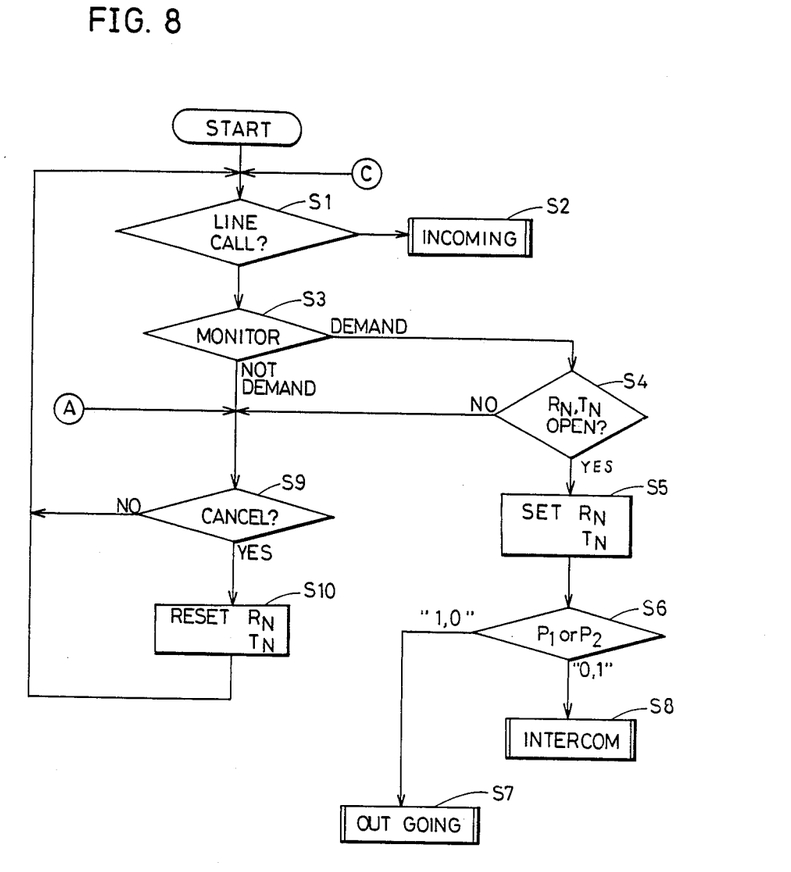
FIGS. 8 to 12 are flow charts showing an example of the operation of a control circuit in a master station.
Figure 9:
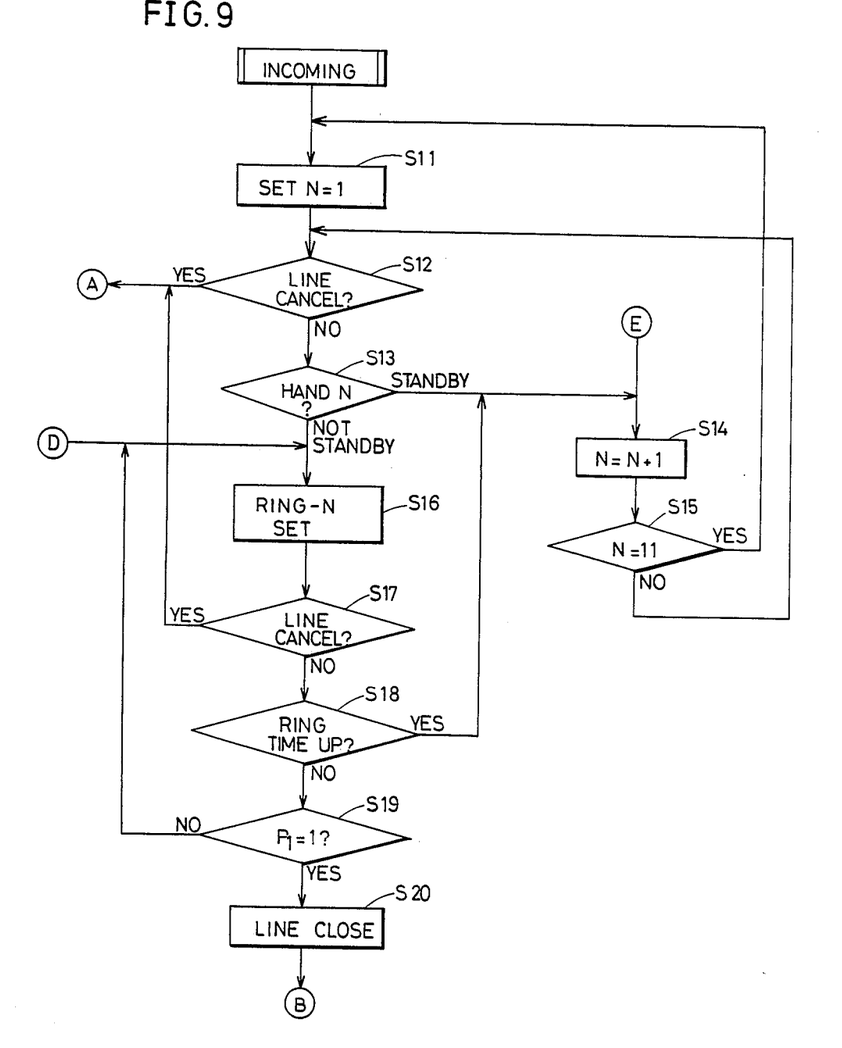
Figure 10:
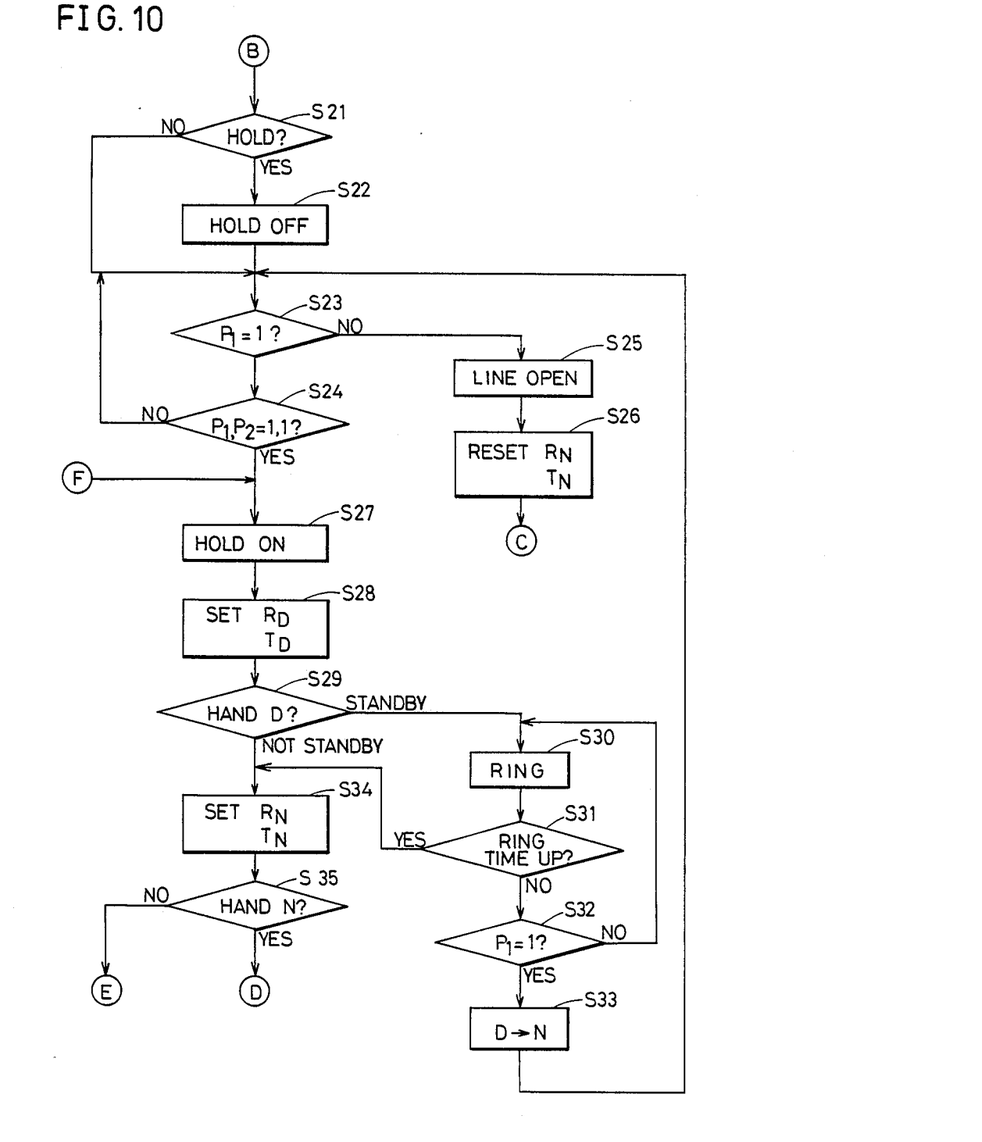

First, referring to FIGS. 8 to 12, the operation of the control circuit 3 will be described. FIG. 8 shows the operation for monitoring the operation states of the respective hand sets. First, it is determined whether or not a call signal comes through the telephone line 2 (in step S1). If a call signal comes through the telephone line 2, the control circuit 3 is immediately brought into the INCOMING operation state for receiving the telephone call (in step S2). The INCOMING operation, which is to be described later, is shown in detail in FIGS. 9 and 10. On the contrary, if a call signal does not come, the receiving frequency of the monitor receiving circuit 4 is changed successively to be tuned to the transmitting frequency of each hand set so that the information signals $P_1$ and $P_2$ from the respective hand sets are received. Based on the received information signals, it is determined whether there is a demand for call to an external station, a demand for intercommunication or the like (in step S3). In this step S3, the information signals $P_1$ and $P_2$ received from the respective hand sets are written in the status table of RAM 18. If there is a demand for call to an external station or a demand for intercommunication from any hand set, the receiving frequency of the call receiving circuit 5 and the transmitting frequency of the call transmitting circuit 6 are tuned to the transmitting and receiving frequencies of the hand set (in step S5). Then, it is determined whether the information signals $P_1$ and $P_2$ represent a demand for a call to an external station or a demand for intercommunication (in step S6). In the case of the demand for call to an external station, the program proceeds to step S7 to apply OUTGOING processing, while in the case of the demand for intercommunication, the program proceeds to step S8 to apply INTERCOM processing. Detailed operations in these steps S7 and S8 are shown in FIGS. 11 and 12, respectively. In the flow chart in FIG. 8, it is determined in step S4 whether the call receiving circuit 5 and the call transmitting circuit 6 are opened or not. In step S9, it is determined whether the use of the telephone line 2 is cancelled or not. In step S10, the call receiving circuit 5 and the call transmitting circuit 6 are disconnected from a specified hand set.

Next, referring to FIGS. 9 and 10, the INCOMING operation in step S2 in FIG. 8 will be described. First, by checking the presence of a call signal continuously coming from the telephone line 2, the number of a hand set in the standby mode is searched out (in steps S11 to S15). Then, the call signal is transmitted to the hand set of the searched out number (namely, the hand set in the standby mode) and by checking the presence of the call signal continuously coming from the telephone line 2, it is determined whether a response signal requiring connection with the telephone line (an information signal having at least $P_1$ set to 1) comes from the hand set concerned (in steps S16 to S19). If a response signal comes from the hand set concerned before a lapse of a fixed period, the telephone line 2 is closed (in step S20). On the contrary, if no response signal comes from the hand set concerned even after the lapse of the fixed period (in step S18), the same operation is applied to another hand set in the standby mode (in steps S14, S15, S12, S13, S16 to S20). In the flow chart in FIG. 9, the number of the hand set whose operation state is to be examined is set to 1 in step S11. In step S13, a hand set in the standby mode is checked by referring to the status table of the RAM 18 and at the same time, a code signal is transmitted to the hand set to observe the presence of a response therefrom so that it is determined whether the hand set is really in the standby mode.

Subsequently, referring to FIG. 10, the flow chart in FIG. 10 mainly shows transfer operation. First, it is determined whether the hand set is in the call state (in step S23). When the call is ended, the telephone line 2 is opened (in step S25) and the call receiving circuit 5 and the call transmitting circuit 6 are disconnected from the hand set (in step S26). Subsequently, the program returns to the above described operation in step S1. On the other hand, if the information signal "1, 1" representing a transfer demand is received from the hand set, the reception is detected in step S24 and the master station in the call state is temporarily detached from the telephone line 2 (in step S27). Then, the receiving frequency of the call receiving circuit 5 and the transmitting frequency of the call transmitting circuit 6 are made to coincide with the transmitting and receiving frequencies of the hand set to which the transfer is to be made (in step S28), and it is determined whether this hand set is in the standby mode or not (in step S29). If the hand set is in the standby mode, the call signal is transferred to the hand set (in step S30) and if a response is made from the hand set within a fixed period, the receiving frequency of the call receiving circuit 5 and the transmitting frequency of the call transmitting circuit 6 are tuned to the transmitting and receiving frequencies of the hand set, to which the transfer is made (in steps S31 to S33). On the contrary, if the hand set to which the transfer is to be made is not in the standby mode, or if no response is made to the transmitted call signal within the fixed period, the receiving frequency of the call receiving circuit 5 and the transmitting frequency of the call transmitting circuit 6 are returned to the transmitting and receiving frequencies of the hand set demanding the transfer (in step S34). Then, it is determined whether the hand set demanding the transfer is in the standby mode or not (in step S35) and if it is in the standby mode, the program returns to the above described step S16. On the other hand, if the hand set demanding the transfer is not in the standby mode, the program returns to the above described step S14. In FIG. 10, it is determined in step S21 whether the telephone line 2 is temporarily detached from the master station 1 with the call state being unchanged. In step S22, processing is performed to connect the temporarily detached telephone line 2 to the master station 1.

Now, referring to FIG. 11, the OUTGOING processing shown in step S7 in FIG. 8 will be described. As described above in connection with FIG. 8, this OUTGOING processing is applied when it is determined that a hand set demands a call to an external station. First, the telephone line 2 is closed (in step S36). Then, a dial signal from the hand set is transmitted through the telephone line 2 to the external station concerned (in step S37). Then, it is always determined whether the hand set is in the call state or not (in steps S38 and S39). If the call is ended, the call receiving circuit 5 and the call transmitting circuit 6 are disconnected from the hand set (in step S40) and the program returns to the above described operation in step S1. On the other hand, if the hand set demands the transfer, the demand is detected in step S39 and the program returns to the above described step S27.

Next, referring to FIG. 12, the INTERCOM processing shown in step S8 in FIG. 8 will be described. First, the receiving frequency of the call receiving circuit 5 and the transmitting frequency of the call transmitting circuit 6 are tuned to the transmitting and receiving frequencies of the hand set to which an intercommunication is to be made (in step S41), and it is determined whether the hand set is in the standby mode or not (in step S42). If the hand set is in the standby mode, a permission signal is transmitted to the hand set demanding the intercommunication (in steps S43 and S44) and the call receiving circuit 5 and the call transmitting circuit 6 are disconnected from the hand set (in step S45). Subsequently, the program returns to the above described step S1. On the contrary, the hand set to which the intercommunication is to be made is not in the standby mode, the call receiving circuit 5 and the call transmitting circuit 6 are disconnected from the hand set (in step S46) and the program returns to the above described step S1.

Then, referring to FIGS. 13 and 14, the operation of the control circuit 40 of the hand set will be described. First, it is determined whether or not a signal for confirming the operation state of the hand set is received from the master station 1 (in step S101). If the signal is received, an information signal "0, 0" representing the standby mode is transmitted (in step S102). Subsequently, it is determined whether the call signal from the master station 1 is received or not (in step S103). If it is received, the speaker 42 is driven (in step S104) and it is determined whether the operator turns on the call switch included in the keyboard 38 (in step S105). If the call switch is turned on, the call state is established. On the contrary, if the signal confirming the operation state of the hand set is not received from the master station 1 and if the OUTGOING processing is required, the operator turns on the above mentioned call switch and then enters an instruction demanding OUTGOING processing by operating the keyboard 38. The turning on of the call switch and the instruction OUTGOING are detected in steps S106 and S107, so that an information signal "1, 0" representing OUTGOING is transmitted from the transmitting circuit 37 (in step S108). Then, if it is determined that the telephone line 2 of the master station 1 is closed (in step S109), a dial signal is transmitted (in step S110) Then, the telephone call can be started whether the hook switch is turned on by taking up the receiver or other similar operation the operator to which the call is made. If the hand set requests transfer during this telephone call, an instruction demanding transfer is entered from the keyboard 38 and the instruction is detected (in step S112) so that an information signal "1, 1" demanding transfer is transmitted (in step S113). After that, the transmitting circuit 37 is turned off (in step S114). It is determined in steps (S115 and S111) whether the call switch is turned off or not, and if the call switch is turned off, the transmitting circuit 37 is turned off (in step S116) and the program returns to the above described step S101.

On the other hand, if the signal confirming the operation state of the hand set is not received from the master station 1 and if an instruction demanding an intercommunication is entered from the keyboard 38, the operations in steps S101, S106 and S107 are performed and then the program proceeds to the operation shown in FIG. 14. First, an information signal "0, 1" demanding an intercommunication and the code signal of the hand set to which the intercommunication is to be made are transmitted (in step S115). Then, it is determined whether a permission signal for the intercommunication is received or not (in step S117). If the permission signal is received, the receiving frequency of the receiving circuit 31 and the transmitting frequency of the transmitting circuit 37 are tuned to the transmitting and receiving frequencies of the hand set to which the intercommunication is to be made (in step S118). Subsequently, a call signal is transmitted (in step S119) and when a response is made from the hand set, the intercommunication is started (in step S121). In steps S116, S120 and S122, it is determined whether the call switch is turned off or not, and if it is turned off, the transmitting circuit 37 is turned off (in step S123) and the program returns to the above described step S101.

Although in the above described embodiment, the master station 1 transmits an identification signal to a certain hand set and the hand set returns an information signal to the master station 1 so as to determine whether or not the certain hand set is really in the standby mode, the hand set may return a confirmation signal instead of the above mentioned information signal. In such a case, a confirmation signal generating circuit is provided in each hand set so that the operation of the confirmation signal generating circuit may be controlled by the control circuit 40. The output of the confirmation signal generating circuit is, needless to say, supplied to the transmitting circuit 37. Otherwise, instead of the above described identification signal and information signal, a carrier signal may be applied to confirm the operation state of a hand set. An embodiment in such a case is shown in FIG. 4.

Figure 4:
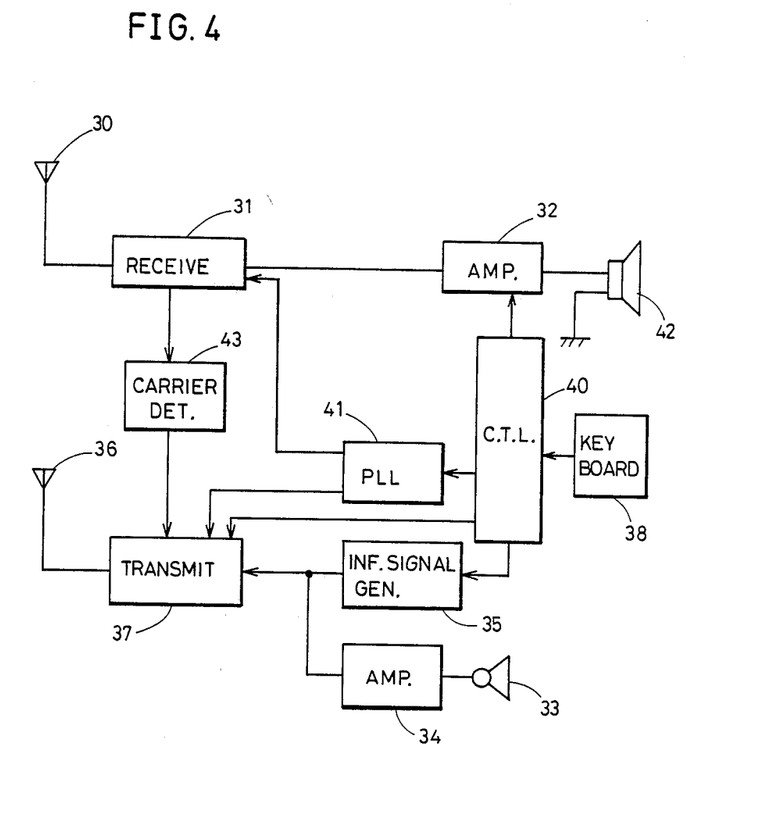
FIG. 4 is a schematic block diagram showing a hand set of use in a cordless telephones of another embodiment of the present invention.

FIG. 4 is a schematic block diagram showing a hand set for use in a cordless telephone of another embodiment of the present invention. In FIG. 4, the structure of this hand set is the same as that of the hand set shown in FIG. 3 except for the below described points and, therefore, detailed description thereof is omitted by designating the corresponding portions by the same reference numerals. In the hand set shown in FIG. 4, such a detecting circuit 39 as shown in FIG. 3 is not provided and instead a carrier detecting circuit 43 is provided.

On the other hand, the structure of the master station in this embodiment is almost the same as the structure of the master station shown in FIGS. 1 and 2 except that the identification signal generator 13 and the identification signal control portion 23 as described above are unnecessary. Accordingly, illustration of the master station is omitted.

The following description of the above mentioned latter embodiment will be made concerning only the operation in the case where the master station confirms whether a certain hand set is really in the standby mode or not since almost the same operation as in the embodiment shown in FIGS. 1 to 3 is performed. In order to confirm whether a certain hand set is really in the standby mode or not, the master station transmits to the hand set an unmodulated carrier signal not modulated. The transmission of this signal is made by means of the call transmitting circuit 6. At this time, the transmitting frequency of the call transmitting circuit 6 is, of course, set to the receiving frequency of the hand set whose operation state is to be confirmed. The hand set shown in FIG. 4 returns no response if the hand set is not in the standby mode, namely, if it is in the completely disabled state. Accordingly, in the absence of response from the hand set, the master station determines that the hand set is not in the standby mode. On the contrary, if the hand set is in the standby mode, the receiving circuit 31 receives the non-modulated carrier signal transmitted from the master station. Then, the carrier detecting circuit 43 detects the non-modulated carrier signal received by the receiving circuit 31 so that the transmitting circuit 37 is temporarily in the enabled state. As a result, the transmitting circuit circuit 37 transmits the non-modulated carrier signal to the master station. In the master station, the non-modulated carrier signal transmitted from the hand set is received by the monitor receiving circuit 4 to be supplied to the control circuit 3 through the first detecting circuit 9. Thus, based on the response from the hand set, the master station determines that the hand set is really in the standby mode.

A program for performing the above described operation will be extremely easily established by those skilled in the art with reference to the flow charts in FIGS. 8 to 14 and, therefore, illustration thereof is omitted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cordless telephone comprising: a single master station connected to a telephone line and a plurality of hand sets, each preset to different transmitting and receiving frequencies, and each able to communicate with said master station by radio;
   master station receiving means having a variable receiving frequency and including a call receiving circuit tunable to a transmitting frequency of any of said hand sets, and a call transmitting circuit tunable to a receiving frequency of said any hand set,
   frequency selecting means for changing said receiving frequency of said master station receiving means so that said receiving frequency may be selectively tuned to the transmitting frequency of each of said hand sets,
   said hand sets each comprising hand set transmitting means for transmitting an information signal representing the operation state and service demands of each hand set, and
   said master station further comprising monitor receiving circuit means having a variable receiving frequency, said monitor receiving circuit being successively tuned to said preset frequencies of each of said plurality of hand sets, said monitor receiving circuit means performing monitoring and communication with each of said hand sets for determining operation states and service demands thereof.

2. A cordless telephone in accordance with claim 1 wherein said monitor means comprises storage means for storing for said each hand set said information signal received by said master station receiving means.

3. A cordless telephone in accordance with claim 2, wherein said master station further comprises:
   search means for searching said storage means to detect a hand set in a standby mode when a call demand is received from said telephone line and for tuning said master station call transmitting circuit to the receiving frequency of said handset detected in said standby mode and for transmitting an identification signal, said receiving frequency of said call receiving circuit being tuned to said hand set transmitting frequency for determining if an information signal from said handset exists and if so said master station transmits a call signal to said hand set, and
   means for transmitting said call demand to said hand set in said standby mode detected by said search means.

4. A cordless telephone in accordance with claim 1, wherein:
   said hand set transmitting means comprises means for transmitting said information signal including a signal indicating a demand for intercommunication between said hand sets as well as a signal for specifying a hand set responding to said demand for intercommunication when a hand set demands an intercommunication to another of said plurality of hand sets;
   said master station further comprises search means for searching said storage means to detect a hand set in a standby mode when a call demand is received from said telephone line and for tuning said master station call transmitting circuit to a receiving frequency of said handset detected in said standby mode and for transmitting an identification signal, said receiving frequency of said call receiving ciruit being tuned to said hand set transmitting frequency for determining if an information signal from said handset exists and if so said master station transmits a call signal to said hand set; and
   said monitor means comprises:
   means for determining the operation state of a hand set specified by said specifying signal upon detection of said information signal indicating said demand for communication and said specifying signal, and
   means for transmitting a permission signal for intercommunication to a hand set making said demand for intercommunication, in response to determination by said determining means that said specified hand set is in the standby mode.

5. A cordless telephone in accordance with claim 1, wherein
   said master station transmitting means transmits a predetermined signal having a transmitting frequency coincident with the receiving frequency of a selected hand set for said determination of said states of said hand set,
   said hand set transmitting means comprises means for transmitting an identification signal predetermined for each of said hand sets as said predetermined signal,
   said hand sets each further comprising:
   coincidence determining means for determining whether an identification signal received by said hand set receiving means coincides with said identification signal predetermined for each of said hand sets, and
   means for transmitting a response signal upon receipt of said predetermined signal from said hand set transmitting means in response to determination of said coincidence by said coincidence determining means.

6. A cordless telephone in accordance with claim 1 wherein said master station transmitting means transmits a predetermined signal having a transmitting frequency coincident with the receiving frequency of a selected hand set for said determination of said states of said hand set, and said hand set transmitting means comprises means for transmitting a non-modulated carrier signal as said predetermined signal.

7. A cordless telephone in accordance with claim 1, wherein said hand sets further comprise, coincidence determining means for determining whether an identification signal received by said hand set receiving means coincides with said identification signal predetermined for each of said hand sets, means for transmitting a response signal upon receipt of said predetermined signal from said hand set transmitting means in response to determination of said coincidence by said coincidence determining means, and said hand said transmitting means comprises means for transmitting as said response signal, an information signal representing the operation state of said hand set.

8. A cordless telephone in accordance with claim 1, wherein said hand sets further comprise, coincidence determining means for determining whether an identification signal received by said hand set receiving means coincides with said identification signal predetermined for each of said hand sets, and means for transmitting a response signal upon receipt of said predetermined signal from said hand set transmitting means in response to determination of said coincidence by said coincidence determining means, and said hand said transmitting means comprises means for transmitting as said response signal, a non-modulated carrier signal.

9. The cordless telephone according to claim 1 wherein said master station call receiving circuit is tuned to the transmitting frequency of a hand set by a manual operation and master station call transmitting circuit is tuned to a receiving frequency of said hand sets by a manual operation.

10. A cordless telephone in accordance with claim 1 wherein each hand set further comprises means responsive to a signal received from said master station for changing the frequency of said hand set to a frequency corresponding to the present frequency of another hand set.

* * * * *